(12) United States Patent
Usami et al.

(10) Patent No.: US 6,408,689 B1
(45) Date of Patent: Jun. 25, 2002

(54) ON-SNOW TIRE-TESTING METHOD, ON-SNOW TIRE-TESTING SYSTEM, AND ROAD SURFACE FOR ON-SNOW TIRE TESTS

(75) Inventors: Koichi Usami; Kouichi Fukuda; Kazuyuki Yamanoi, all of Tochigi (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/650,428

(22) Filed: Aug. 28, 2000

(30) Foreign Application Priority Data

Aug. 31, 1999 (JP) .......................................... 11-246368

(51) Int. Cl.[7] .............................................. B60C 23/02
(52) U.S. Cl. ....................................................... 73/146
(58) Field of Search ................................. 73/146, 146.8, 73/146.3, 9; 428/15, 406; 701/80; 340/444

(56) References Cited

U.S. PATENT DOCUMENTS

| | | | |
|---|---|---|---|
| 4,098,111 A | * 7/1978 | Hardmark et al. ................ 73/9 |
| 5,056,354 A | * 10/1991 | Kuwana et al. ................... 73/9 |
| 5,266,367 A | 11/1993 | Miura et al. .................. 428/15 |
| 5,436,039 A | 7/1995 | Miura et al. .................. 428/15 |
| 5,556,671 A | * 9/1996 | Miura et al. .................. 428/15 |
| 5,632,152 A | 5/1997 | Miura et al. .................... 62/74 |
| 5,660,935 A | 8/1997 | Kambayashi et al. ....... 428/405 |
| 5,753,370 A | 5/1998 | Kambayashi et al. ....... 428/405 |
| 6,076,035 A | * 6/2000 | Yanase ......................... 701/80 |
| 6,266,603 B1 | * 7/2001 | Taffin et al. .................. 701/87 |

FOREIGN PATENT DOCUMENTS

JP 11-044613 2/1999

OTHER PUBLICATIONS

This Snova System, Jun. 30, 2000, http://www.snova.gr.jp/eprofile/system.html.

* cited by examiner

Primary Examiner—Benjamin R. Fuller
Assistant Examiner—Jewel V. Thompson
(74) Attorney, Agent, or Firm—Sughrue Mion PLLC

(57) ABSTRACT

An artificial snow layer 83 in which artificial snow is arranged in a layered form is provided on a turntable 72, and on-snow testing is performed by rotating the turntable 72 and rotating the tire 11 on the artificial snow layer 83. The artificial snow is made from a frozen granular water-absorbent material that has been made to absorb water. The artificial snow can be reused, and on-snow testing of the tire 11 can be performed at low cost by performing testing of the tire 11 on the turntable 72.

26 Claims, 10 Drawing Sheets

ON-SNOW TIRE-TESTING METHOD, ON-SNOW TIRE-TESTING SYSTEM, AND ROAD SURFACE FOR ON-SNOW TIRE TESTS

BACKGROUND OF THE INVENTION

1. Technological Field of the Invention

The present invention relates to an on-snow tire-testing method, an on-snow tire-testing system, and a road surface for the on-snow testing of tires.

2. Background Art

Heretofore, in testing the performance of tires on snow, generally a test course on which snow has accumulated has been used.

Nevertheless, the aforesaid method is problematic in that testing can be performed only during winter, when snow has fallen.

Testing methods have been considered whereby artificial snow is created by finely pulverizing ice or freezing sprayed water, and this artificial snow is spread on a road surface, but the problem is that large-scale facilities are required for this method.

When testing is performed by spreading this type of artificial snow on the road surface, in order to prevent the snow produced from melting, it is necessary to refrigerate a large road surface, to lay the road surface inside an enclosed structure, and to maintain the air temperature inside the structure below the freezing point.

Further, since the snow cannot be reused once it has melted, it must be disposed of as wastewater. When long-term testing is performed, the snow is melted after the completion of testing and must be disposed of in a sewer system as water, and then artificial snow must be created again for the next set of tests, requiring large quantities water.

SUMMARY OF THE INVENTION

The present invention was produced in light of this situation and has an object of offering an on-snow tire-testing method, an on-snow tire-testing system, and a road surface for snow-testing tires, which enables snow testing of tires to be performed at low cost.

The on-snow tire-testing method of the present invention involves testing tires on an artificial snow layer obtained by placing artificial snow in a layered form and cooling the snow. The artificial snow is composed of a granular water-absorbent material that has been made to expand by the addition of water.

In the on-snow tire-testing method according to the present invention, various types of snow tests for tires are performed on the artificial snow layer after it has been cooled. In this way, snow test data for tires can be obtained at any time without requiring snowfall.

Further, since the water is held in the water-absorbent material even if the artificial snow is melted, it returns to the form of artificial snow when cooled and frozen.

The term "cooling" used here means making the artificial snow into a form like that of actual snow, and may involve complete freezing or partial freezing of the artificial snow.

The artificial snow layer may be obtained by placing the artificial snow in a layered form on an ice layer and cooling the snow.

Since the artificial snow changes its form according to the temperature in the same way as actual snow, in order for the artificial snow as a whole to assume a uniform state, it is necessary to reduce temperature irregularities.

By providing an ice layer on the underside of the artificial snow layer, the artificial snow layer as a whole can be maintained at a constant temperature, and snow test data can be obtained with a high degree of reliability with a uniform artificial snow layer.

The ice layer is cooled by means of a cooling device which is arranged on the bottom face of the snow layer and/or the interior of the snow layer.

Even if the air temperature is high (e.g., exceeds 0° C.), the melting of the ice layer and artificial snow layer can be prevented, and the initial road conditions can be maintained. Moreover, depending upon the conditions, the ice layer and artificial snow layer can be maintained at a temperature of 0° C. or less.

The artificial snow may be compressed and used. By compressing the artificial snow, the artificial snow layer assumes a state similar to that of an actual compressed snowy road, for example, and test data is obtained similar to test data obtained when on-snow testing is performed using an actual compressed-snow road.

Various types of road conditions can be reproduced by increasing or decreasing the amount of compression. For example, various road surface conditions from a soft-compressed snow road to a hard-compressed snow road can be reproduced by increasing or decreasing the amount of compression when compressing the artificial snow. Accordingly, snow test data for the desired road conditions can be obtained.

Testing tires is performed on the artificial snow layer which rotates. Since the tire-testing is performed on a rotating artificial snow layer, testing is simpler than when the tire is installed on a test vehicle and driven, and the snow testing of tires can be performed in a smaller space.

A tire is rotated on the artificial snow layer, which is rotated, and slipping between the artificial snow layer and the tire, which is generated by increasing or decreasing the rotational speed.

For example, by increasing the rotational speed of the tire, and setting the circumferential speed of the tire at higher speed than the speed of movement of the artificial snow layer (the portion in contact with the tire), conditions when driving, when accelerating, etc., can be reproduced.

Further, by reducing the rotational speed of the tire, and setting the circumferential speed of the tire at lower speed than the speed of the movement of the artificial snow layer (the portion in contact with the tire), conditions such as those of deceleration can be reproduced.

The tangential direction of rotation of the artificial snow layer and the direction of the equatorial plane of the tire can be made to differ, and the tire is thereby provided with a slip angle. Snow-testing data when the tire is provided with a slip-angle can therefore be obtained.

By increasing or decreasing the water absorption factor by 10 to 100 times, various road surface conditions can be reproduced. That is, by increasing or decreasing the water added to the granular water-absorbent material by 10 to 100 times the weight (mass) of the water-absorbent material, artificial snow having various states can be obtained, and various road surface conditions similar to actual road surfaces can thereby be reproduced. Accordingly, snow-testing data can be obtained for the desired road surface conditions.

The artificial snow layer is also able to reproduce various road surface conditions by increasing or decreasing the temperature of the artificial snow layer and/or the ice layer. Accordingly, on-snow test data for a desired set of road conditions can be obtained.

The water-absorbent material is preserved and reused. After the completion of testing, the artificial snow, i.e., water-absorbent material, is preserved and can be reused for the next test. Accordingly, it is not necessary to prepare a new water-absorbent material for each test, testing can be performed with a minimal quantity of water-absorbent material, and the cost of testing can be minimized.

The water-absorbent material is preserved in a gel form containing water. Since the artificial snow, i.e., water-absorbent material, is preserved in a gel form containing water, it is not necessary to add water when performing the next test. When the moisture in the gel evaporates due to storage conditions, an amount water equivalent to the amount evaporated is injected.

The on-snow tire-testing system includes an artificial snow layer arrangement device, which arranges artificial snow composed of a granular water-absorbent material made to expand by the addition of water in a layered state, a cooling device, which cools the artificial snow layer, and a tire-testing device, which can rotate and which supports the tires and performs testing on the tires on the artificial snow layer.

The tire-testing device has a tire pressing device, which presses the tire on the artificial snow layer. Thus, the load applied to the tire can be easily changed in comparison with cases where testing is performed by driving a test vehicle on which tires have been installed, and testing can be performed by applying various loads to the tires.

The tire-testing device has a driving/braking device, which exerts a driving force or braking force on the tire. Thus, tests relating to tire driving or braking can be performed, and test data on the driving properties and braking properties can be obtained.

The tire-testing device has a slip-angle applying device, which provides the tire with a slip-angle by causing the tangential direction of the rotation of the artificial snow layer and the direction of the equatorial plane of the tire to differ. Accordingly, the tire can be tested by applying a slip-angle to the tire, and on-snow test data when a slip-angle is applied can be obtained.

A tire moving device moves the tire along the rotational radial direction of the artificial snow layer.

In the case where the artificial snow layer is made to rotate while the tire is pressed against the artificial snow layer, if the position of the tire (position in the radial direction) does not change, the tire will run over and over on the same area of the artificial snow layer, and a rut will be gradually worn in the artificial snow layer, such that the road surface conditions will change. For this reason, by moving the tire along the rotational radial direction of the artificial snow layer, testing can be continued for a longer period of time under constant road surface conditions.

A pressure-rotation device applies pressure to the artificial snow layer while rotating the artificial snow layer. For this reason, the artificial snow layer can be set in conditions similar to those of actual compressed snow road surfaces.

A leveling device levels the surface of the artificial snow layer. The surface of the artificial snow layer can be made uniformly flat by the leveling device without manual operation, and accordingly tires can be tested on an evenly flat artificial snow layer.

When the tire is driven over and over in the same area of the artificial snow layer, a rut is gradually worn in the artificial snow layer, and road surface conditions will change, but the road surface can be leveled for each test, or testing can be performed while the road is leveled.

The on-snow tire-testing system may include a snow removal device. The artificial snow that has been arranged on the artificial snow arrangement device can be removed by the snow removal device. For example, this device can be used when the artificial snow is to be stored in another place after testing, or when it is to be replaced with artificial snow in a different state.

The on-snow tire-testing system may also include a snowfall device, which causes artificial snow to fall on the artificial snow layer. If artificial snow is made to fall while the artificial snow layer arrangement device is made to rotate, for example, an artificial snow layer can be easily formed on the artificial snow layer arrangement device, and road surface conditions in which new snow has accumulated can be obtained.

A road surface for on-snow testing of tires has as its uppermost portion an artificial snow layer which is caused to swell by the addition of water to a granular water-absorbent material, and the artificial snow layer is cooled. Accordingly, various types of on-snow testing of tires can be performed on a cooled artificial snow layer, and on-snow testing of tires can be performed at any time without requiring snowfall.

Since the state of artificial snow varies according to the temperature, in the same way as with actual snow, it is necessary to reduce temperature unevenness in order to make the entire artificial snow layer into a uniform state.

By placing an ice layer on the underside of the artificial snow layer, the artificial snow layer as a whole can be maintained at a roughly even temperature, and it is possible to obtain on-snow testing data having high reliability with the artificial snow layer in a uniform state.

Finally, testing can be performed by installing a tire anti-slip device on the tire. It is therefore possible to obtain on-snow testing data for tires to which an anti-slip device has been attached.

BRIEF DESCRIPTION OF THE DRAWING FIGURES

DETAILED DESCRIPTION OF THE PREFERRED EMBODIMENTS

An on-snow tire-testing device 10 which is an embodiment of the invention is explained referring to FIG. 1 through FIG. 9.

Figure 2:
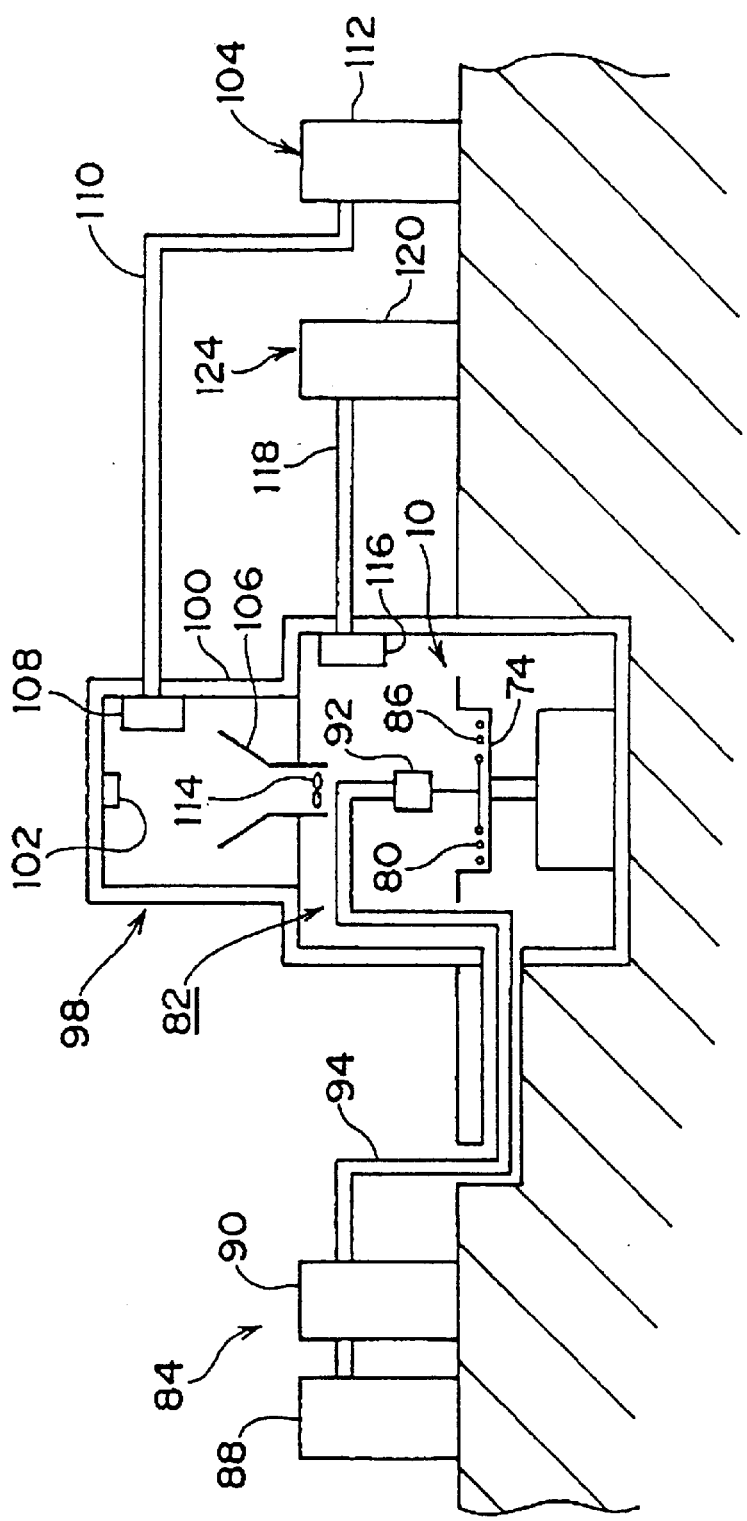
FIG. 2 is a diagram of the cooling device and the piping of the cooling device.

As shown in FIG. 2, the on-snow tire-testing device 10 of this embodiment is placed inside a testing room 82 which is covered with an insulating material (not shown).

Figure 1A:
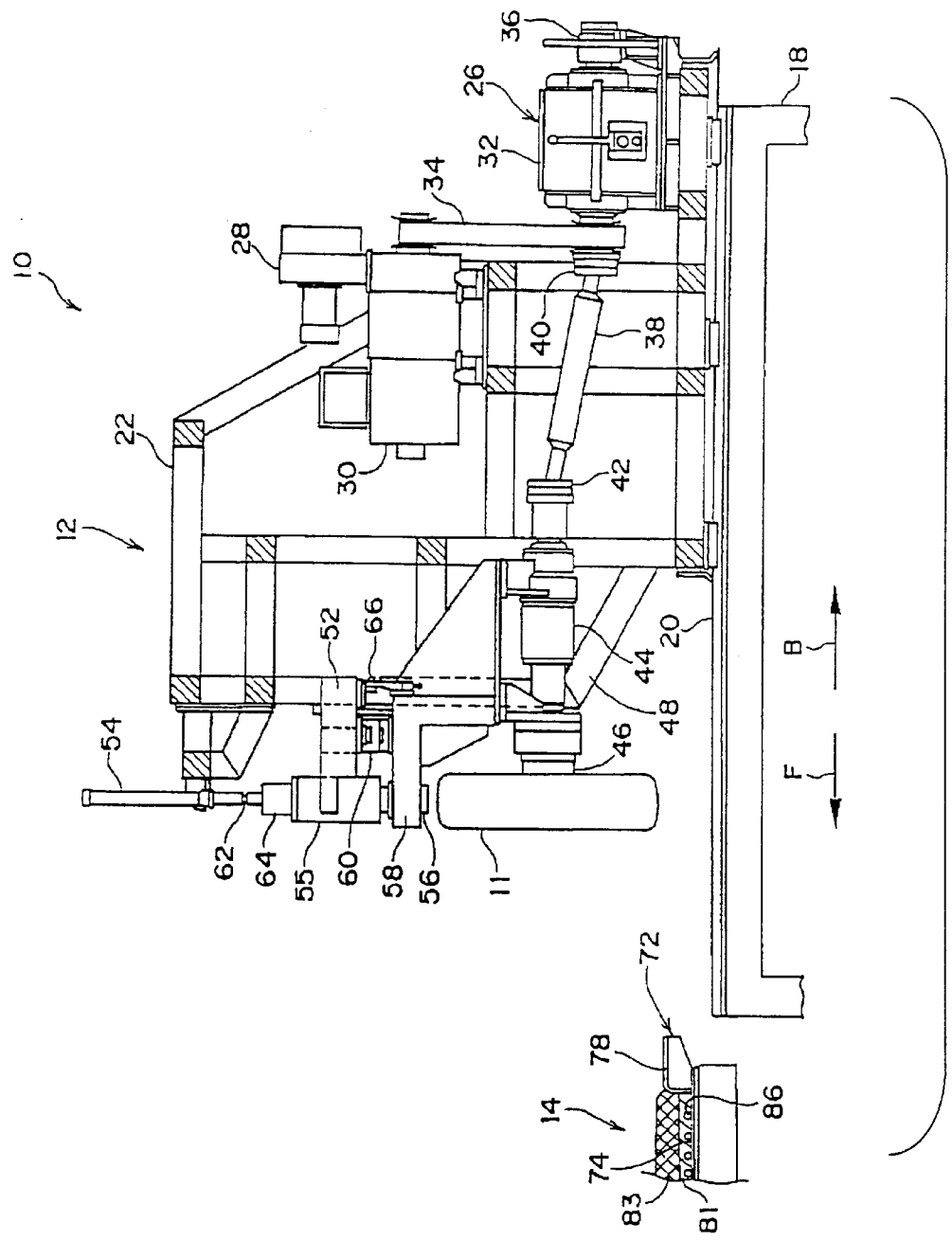
FIG. 1(A) is a partial sectional view of the on-snow tire-testing device as seen from the tire holding part area.
Figure 1B:
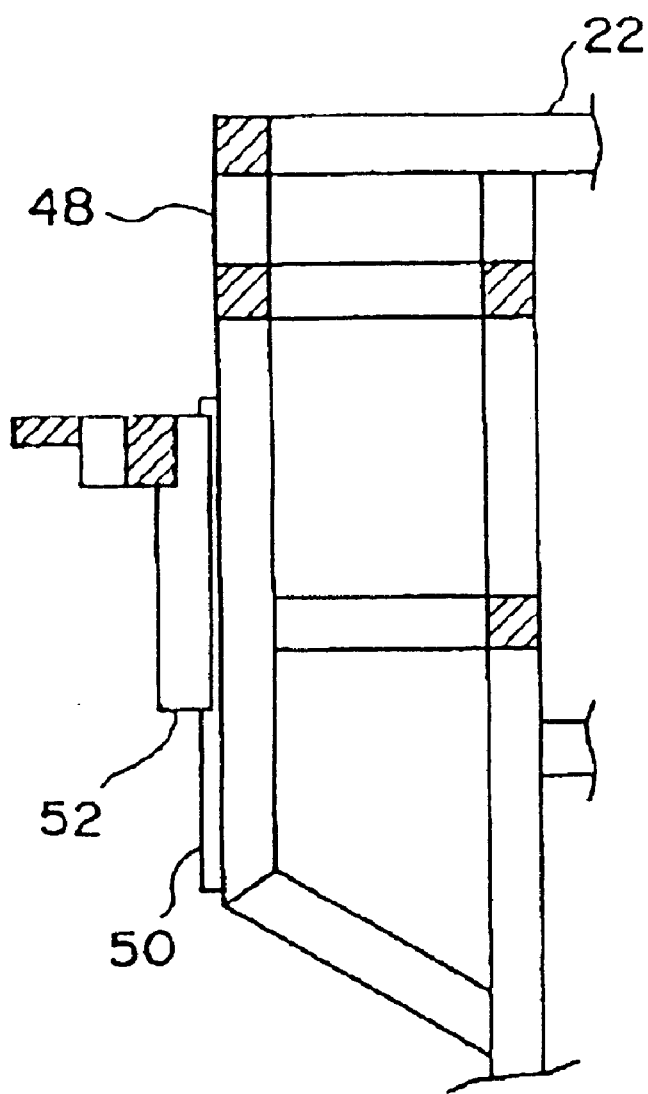
FIG. 1(B) is a sectional view along the line 1(B)—1(B) in FIG. 4.
Figure 3:
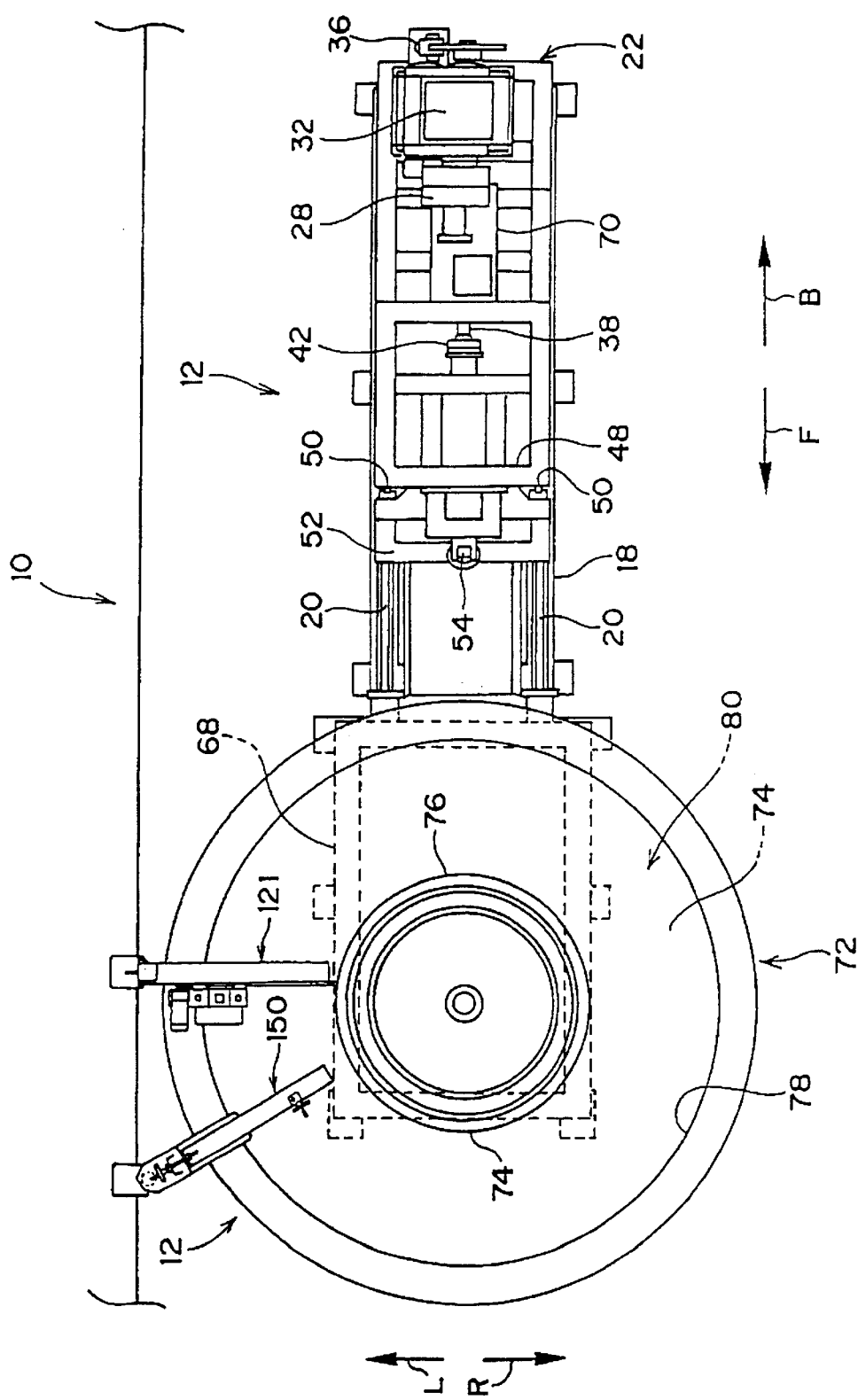
FIG. 3 is a plan view of the on-snow tire-testing device.

Shown in FIG. 1(A) and FIG. 3, the on-snow tire-testing device 10 is provided with a tire holding part 12, which holds the tire 11 to be tested and operates a tire-testing device that performs the testing of the tire 11, and a turntable part 14 on one side of the tire holding part 12.

The tire holding part 12 is provided with a base 18, which is fixed inside the test chamber 82.

On the upper face of the base 18, a pair of guide rails 20, which extend parallel in the radial direction of the turntable part 14, are provided, and a movable frame 22 is supported so as to be able to slide freely along these guide rails 20.

On this base 18, a driving device (not shown in the figures) such as a hydraulic motor is provided for moving the movable frame 22. The driving device is controlled by a control device (not shown in the figures).

A tire driving/braking device 26 for causing the tire 11 to rotate is provided on the movable frame 22.

The tire driving/braking device 26 includes a motor 28, a decelerator 30, a clutch 32, a belt 34, which transfers driving force on the output shaft of the decelerator 30 to a shaft (not shown in the figures) of the clutch 32, a brake 36, a driveshaft 38, equal velocity joints 40 and 42, a driveshaft 44, and a spindle 46 to which the tire 11 is attached.

The driving force of the motor 28 is transferred to the shaft (not shown in the figures) of the clutch 32 via the belt 34, and is transferred to the tire 11 via the equal velocity joint 40, driveshaft 38, equal velocity joint 42, driveshaft 44, and spindle 46.

The brake 36 is linked to the other shaft (not shown in the figures) of the clutch 32, and by operating the brake 36 connecting the clutch 32, the rotation of the tire 11 can be halted or the rotational speed reduced.

An rpm detection sensor (not shown in the figures) which detects rotational speed of the tire 11 is provided on the tire driving/braking means 26. The rpm detection sensor, the clutch 32, and the brake 36 are connected to a control device (not shown in the figures), and the control device is able to control the rotational speed of the tire 11. When the outer diameter of the tire 11 is input to the control device, the control device calculates the rotation speed of the tire.

A gate-form frame 48 is provided on the upper portion of the turntable side of the movable frame 22.

Figure 4:
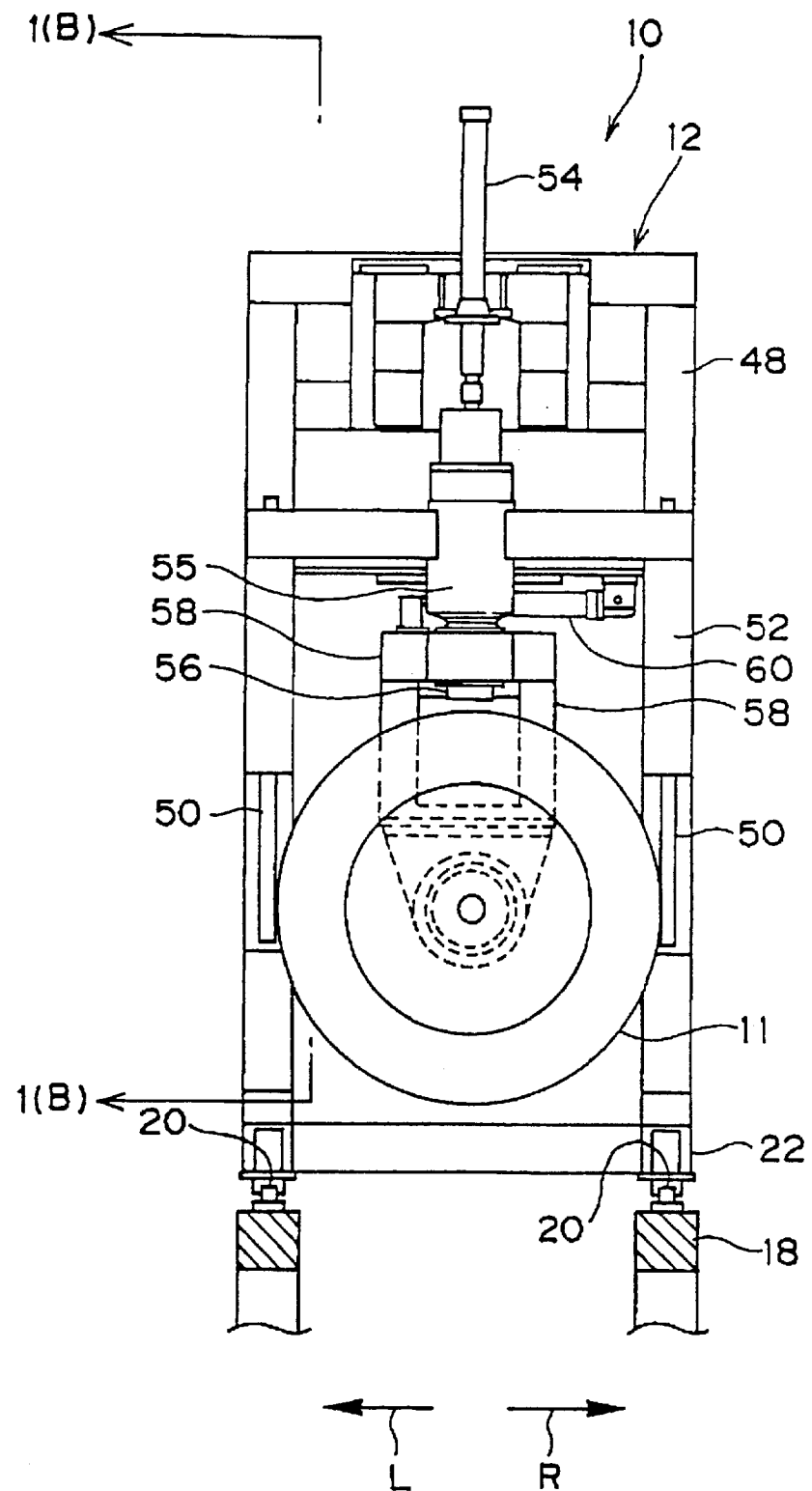
FIG. 4 is a front view of the tire holding part in the on-snow tire-testing method.

As shown in FIGS. 1(A) and (1), FIG. 3, and FIG. 4, a pair of guide rails 50 which extend in a vertical direction, are provided on the lateral face on the turntable side of the gate-form frame 48, and an elevator frame 52 is able to move freely in the vertical direction along these guide rails 50.

A hydraulic cylinder 54 for moving the elevator frame 52 in the vertical direction is provided via a cylinder attachment frame 48 having an open-rectangle-shaped form (see FIG. 3) when seen from above in the vicinity of the upper end portion on the side in the direction indicated by the arrow F on the gate-shaped frame 48.

A bearing 55 is provided on the elevator frame 52 and a steering shack 56 is held so as to be able to rotate freely on the bearing 55, having its axial center in the vertical direction.

An L-shaped frame 58 is attached to the lower end of the steering shaft 56 in a suspended form, and hydraulic steering cylinder 60 for turning the L-shaped frame 58 centering on the steering shaft 56 is attached to the elevator frame 52. The piston rod (not shown in the figures) of the hydraulic steering cylinder 60 is connected to the L-shaped frame 58.

The aforesaid spindle 46 is connected so as to rotate freely on the bottom face of the L-shaped frame 58 having its axial center in a horizontal direction. Normally (when the slip-angle discussed below is 0°), the rotational center of the turntable 72 described below is positioned on the extension line of the axial center of the spindle 46.

The spindle rod (not shown in the figures) of the hydraulic cylinder 54 is connected to the elevator frame 52 via a rod cell 64 for detecting the load applied to the tire 11.

An angle sensor 66, which detects the angle of the L-shaped frame 58, i.e., the direction of the equatorial plane of the tire 11 (slip angle), is provided between the elevator frame 52 and L-shaped frame 58.

The load cell 64 and angle sensor 66 are connected to the control device, which is not shown in the figures.

The hydraulic cylinder 54 is connected to a hydraulic pump via a pressure adjustment valve which is not shown in the figures.

The pressure adjustment valve and hydraulic pump are connected to the control device, and control device is able to monitor the force acting on the load cell 64, i.e., the load applied to the tire 11, by an electrical signal from the load cell 64. The control device controls the pressure adjustment valve so that a load that has been set by a setting dial on a control panel, not shown in the figures, acts on the tire 11.

The turntable part 14 is provided with a turntable 72, which is supported by a bearing, not shown in the figures, so as to be able to rotate on a frame 68 which has been installed in the test chamber 82, and is made to rotate by a motor 70.

A turntable rotational speed detection sensor (not shown in the figures), which detects the rotational speed of the turntable 72, is provided on the turntable 72. The motor 70 and turntable rotational speed detection sensor are connected to a control device, not shown the figures, and this control device controls the rotational speed of the motor 70.

The aforesaid tire holding part 12 is provided with a distance sensor (not shown in the figures), which detects the distance from the rotational center of the turntable 72 to the tire 11 in the radial direction of the turntable 72.

The distance sensor is connected to a control device, not shown in the figures, and this control device is able to calculate a speed of the part with which the tire is in contact based on the rotational speed of the turntable 72 and the distance of the tire 11 from the center rotation of the turntable 72.

The turntable 72 is provided with a disk 74, which forms the floor part. A tubular inner collar 76 is provided on the inner circumferential side, and a tubular outer collar 78 on the outer circumferential side on the disk 74, and the artificial snow filling part 80 is placed between the inner collar 76 and outer collar 78 on the disk 74.

In this embodiment, the bottom layer of the artificial snow filling part 80 comprises an ice layer 81, in which water is frozen and the upper layer, an artificial snow layer 83 composed of artificial snow.

As shown in FIG. 2, an artificial snow cooling device 84 for cooling the ice and artificial snow with which the artificial snow filling part 80 is filled is provided on the tire snow-test device 10.

The artificial snow cooling part 84 provides a coolant to a coolant tube 86 on the disk 74 of the artificial snow filling part 80.

On the outside of the test chamber 82, an air-cooled type brine chiller 88 and a brine tank 90, which stores a coolant produced by the brine chiller 88, are installed, and the coolant tube 86 provided on turntable 72 is connected to the brine tank 90 via a rotation joint 92 and piping 94.

A snowfall device 98 is attached to the testing chamber 82.

The snowfall device 98 is provided with a small chamber 100 and cooling device 104, which are placed in the upper portion of the testing chamber 82.

The cooling device 104 is composed of an internal machine 108 placed inside the small chamber 100, and an external machine 112, which is placed outside the small chamber 100 and connected with the internal machine 108 by piping 110.

Inside the small chamber 100, a funnel part 106, which collects the artificial snow and drops it onto the lower part, is provided. A screw 114, which is turned by a motor for gradually dropping the artificial snow that has been collected onto the turntable 72, is provided at the lower end of the funnel part 106.

This snowfall device 98 is provided with a nozzle spraying water into the small chamber 100, and it cools the interior of the small chamber 100, sprays water from the nozzle 102, and produces artificial snow (granules of water).

An interior cooling device 124 is provided for the test chamber 82.

The interior cooling device 124 is composed of an interior machine 116, which is placed inside the test chamber 82, and an exterior machine 120, which is placed outside the test chamber 82 and is connected with the interior machine 116 by piping 118.

Next, the artificial snow used to fill the artificial snow filling part 80 is explained.

The artificial snow used to fill the artificial snow filling part 80, in this embodiment, is obtained by at least partly freezing a granular, water-absorbent material that has been made to absorb water.

Examples of water-absorbent materials that can be used in this embodiment include starches, celluloses, polymers, copolymers, terpolymers, etc., of acrylamide, acrylic acid, acrylates, methacrylates, styrene, vinyl ether, etc., and other synthetic resin materials, but among these, polyacrylates obtained by reverse-phase suspension polymerization in an organic solvent, copolymers of vinyl alcohol and acrylates, or copolymer saponification products of isobutylene and maleic anhydride, which exhibit a spherical form, are especially desirable.

It is especially desirable that the form of the water-absorbent material used in the present embodiment be spherical, and that the granule diameter before absorbing water be within a range of about 20–500 $\mu$m, and about 0.05 mm–2 mm after absorbing water.

If the granule diameter before absorbing water is less than about 20 $\mu$m, the material will be too fine, and the artificial snow will become too hard, and if it exceeds 500 $\mu$m, the artificial snow will become coarse, which is undesirable.

The reasons that a water-absorbent material having a spherical form is desirable include ease of handling, the fact that the artificial snow obtained by freezing will also be spherical, and since the artificial snow is spherical, the slipping properties will be as good as actual snow, the snow will be difficult to melt due to the effects of warm air, etc., and will be suitable for tire testing, and testing can be performed economically.

In order to maintain the fluidity in a spherical form even after water has been absorbed by the water-absorbent material used in the embodiment, and to make the granules have properties that prevent them from adhering to one another, the degree of cross-linking may be increased by a polyvalent epoxy or polyvalent amine. However, if the material is excessively cross-linked, then water absorbing capacity will decrease, so the amount of cross-linker must be adjusted so as to maintain a suitable water absorbing capacity.

The maintenance of fluidity through the spherical form of the water-absorbent material used in the present invention after it has absorbed water is thought to occur because there is little water adhering between the granules that have absorbed water, and the granules are able to slip against one another, creating air gaps.

When water has been absorbed into the water-absorbent material, it assumes a paste-like form, and when frozen in a paste-like form, it becomes a single large clod of ice and cannot be used as artificial snow for tire-testing unless it is finely pulverized. Moreover, this artificial snow is difficult to maintain so as to be suitable for tire testing, as described above, and is not desirable.

The artificial snow of this embodiment, which is obtained by freezing the water-absorbent material made to absorb water, can be dispersed finely and uniformly and can be given a powdery texture according to the freezing method, granule diameter, water absorption ratio, water absorbing ability, etc., and can even be made so that the granules adhere lightly to one another.

The water-absorbent material used in this embodiment should have a water-absorbing ability with regard to ion-exchange water of 30–500 times, preferably 50–200 times.

If the water-observing ability is less than 30 times, since the water-absorbing ability of the artificial snow will be low, liquid water produced when the artificial snow melts will be absorbed, and it will be difficult to the maintain the artificial snow in its desired condition.

On the other hand, if the water-absorbing ability exceeds 500 times, the gel strength when water has been absorbed will be weak, and the material will easily break down when pressure is applied, which is not desirable.

The amount of water absorbed in the water-absorbent material should be less than the maximum amount of water that can be held by the water absorbent material, preferably in a range of about 10–100 times by water-absorption ratio.

When a soft artificial snow is desired, the water-absorbing ratio should be in a range of about 10–50 times, and when a hard artificial snow is desired, the water-absorption ratio should be in a range of about 30–100 times.

When the artificial snow obtained by absorbing water into the water-absorbent material is less than the maximum water holding capacity, and when this material still having water-absorbing capacity is frozen, the snow quality of the target condition does not change by absorbing water in a liquid form produced by the melting of the artificial snow due to increasing air temperature, etc.

For example, when a hard and heavy snow quality is desired, the granule diameter is made small (20–500 $\mu$m), and the ratio of the water absorption ratio/water absorbing capacity is increased (30–80%).

On the other hand, when a soft and light snow quality is desired, the granule diameter is increased (150–500 $\mu$m), and the ratio of the water absorption ratio/water absorbing capacity is decreased (10–50%).

Any method may be used for the absorption of water into the water-absorbing material, for example, pouring the granules into water under agitation, and exposure for several minutes, depending upon the water absorption ratio, may be sufficient.

The water-absorbent material can be maintained in a stable condition for many hours releasing hardly any moisture, even when exposed to room temperature, so that even if the process until artificial snow is created (until frozen) takes a certain amount of time, the artificial snow is not subject to particularly harmful effects even when placed under melting conditions for a certain point of time.

The method of freezing the water-absorbent material may be a method whereby quick-freezing is performed while mixing is performed in direct contact with dry ice, liquid nitrogen, liquid air, or other cooling agents, or a method whereby freezing is performed by placing the water-absorbent material on a cold pipe, sheet, floor, board, etc.

The temperature of the frozen artificial snow should be in a range of approximately 0 to −30° C., but this temperature will vary according to various conditions and can be selected as appropriate.

As the water-absorbent material, for example, that manufactured by the method specified in Japanese Patent Publication No. 2782375 is desirable.

As shown in FIG. 3, a snow-packing device 121 is provided on the on-snow tire-testing device 10.

Figure 5:
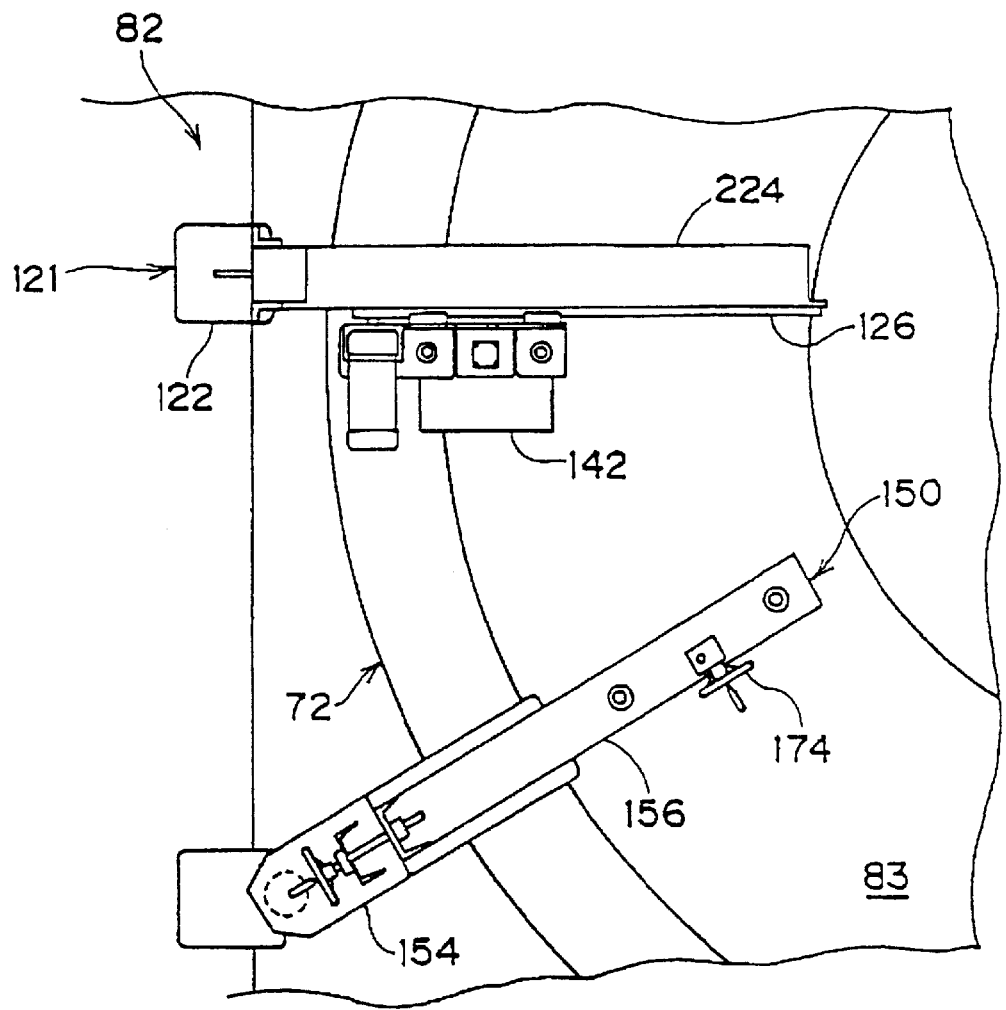
FIG. 5 is a plan view of the snow packing device and the turntable in the vicinity of the leveling device.
Figure 6:
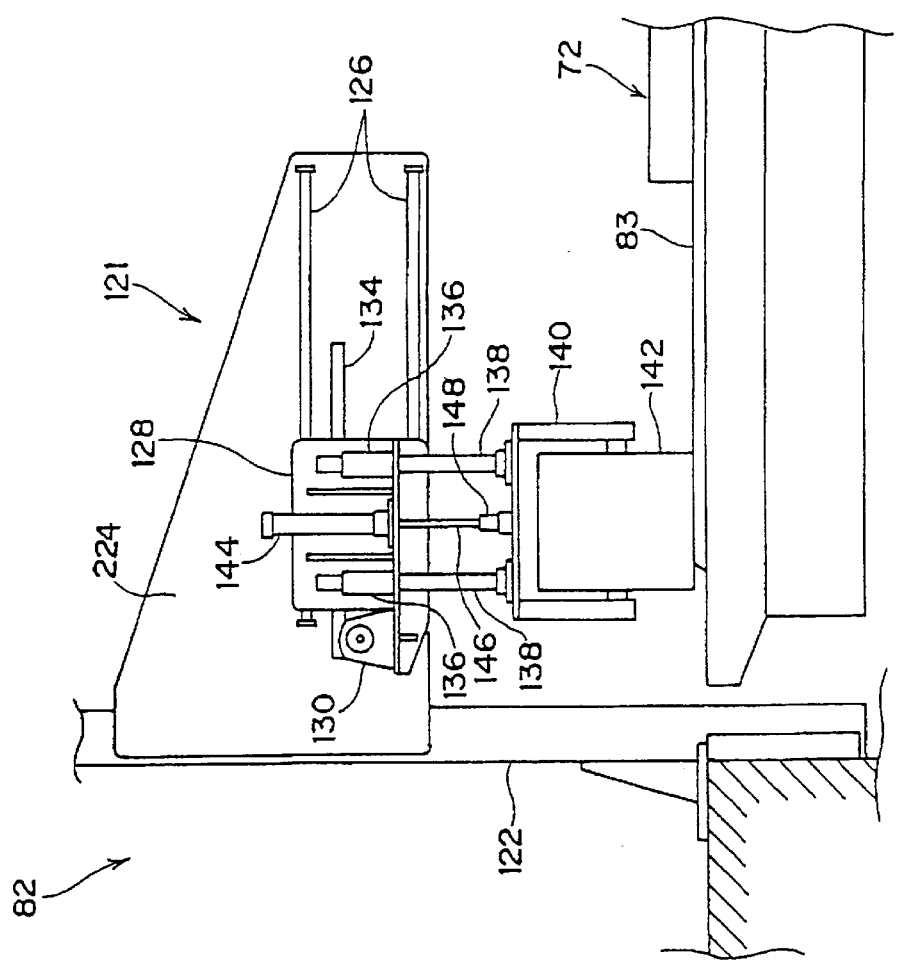
FIG. 6 is a front view of the snow packing device.
Figure 7:
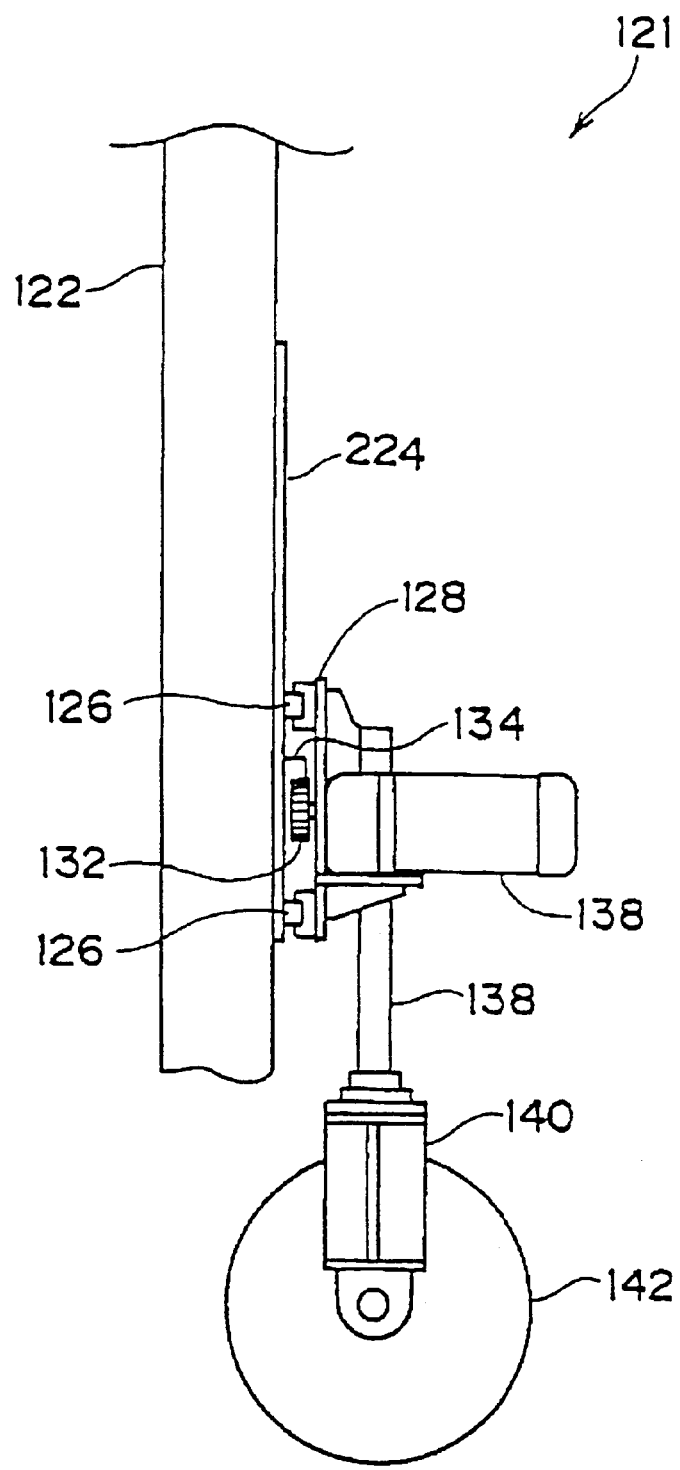
FIG. 7 is a lateral view of the snow packing device.

As shown in FIG. 5 through FIG. 7, the snow packing device 121 is provided with a support column 122, and a frame 224 which extends toward the rotational center of the turntable 72 is attached to this support column 122.

A pair of guide rails 126 are attached horizontally to the lateral phase of the frame 224.

A moving frame 128 is supported so as to be able to slide on these guide rails 126.

A motor 130 is attached to this moving frame 128. A flat gear 132 is attached to the rotating shaft (not shown in the figure) of this motor 130, and this flat gear 132 engages with a rack 134 that is provided on the lateral face of the frame 224.

Accordingly, the moving frame 128 can be moved by the rotation of the motor 130.

A pair of slide bushes 136 are attached to the moving frame 128 having their axial line in the vertical direction.

Slide shafts 138 are inserted so as to be able to slide into the slide bushes 136 and, at the lower ends of the slide shafts 138, a roughly open-rectangle-shaped roller support piece 140 is attached.

A pressure-rotation roller 142, having a fixed outer diameter with the rotational axis in the horizontal direction, can rotate and is supported on this roller support piece 140.

A hydraulic cylinder 144 is attached to the moving frame 128, and the front end of the piston rod 146 of this hydraulic cylinder 144 is attached to the roller support piece 140 via a load cell 148.

Thus, by moving the hydraulic cylinder 144, the pressure-rotation roller 142 can be moved up and down.

When the pressure-rotation roller 142 is made to compress the artificial snow on the turntable 72, the action on the pressure-rotation roller 142 is detected by the load cell 148.

The hydraulic cylinder 144 is connected to a hydraulic pump via a pressure adjustment valve which is not shown in the figures.

The pressure adjustment valve is connected to a control device, and the control device is able to monitor the force acting on the load cell 148, i.e., the load applied to the pressure-rotation roller 142, by electrical signals from the load cell 148. The control device controls the pressure adjustment valve so that a load set by a setting dial (not shown in the figures) is applied to the pressure-rotation roller 142.

Additionally, a pressure-rotation roller position sensor (not shown in the figures), which detects the position (radial direction of the turntable 72) of the pressure-rotation roller 142 on the turntable 72, is provided in the frame 224.

The pressure-rotation roller position sensor and motor 130 are connected to a control device which is not shown in the figures, and the control device is able to adjust the position of the pressure-rotation roller 142 by controlling the rotation of the motor 130.

Figure 8:
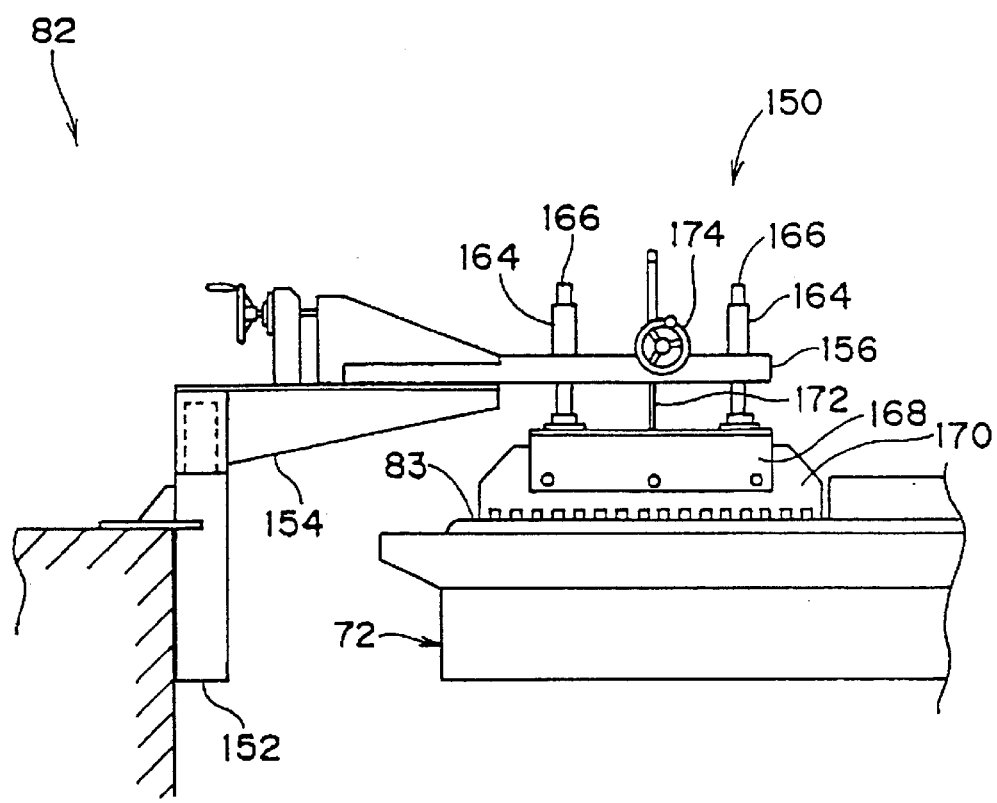
FIG. 8 is a front view of the snow leveling device.
Figure 9:
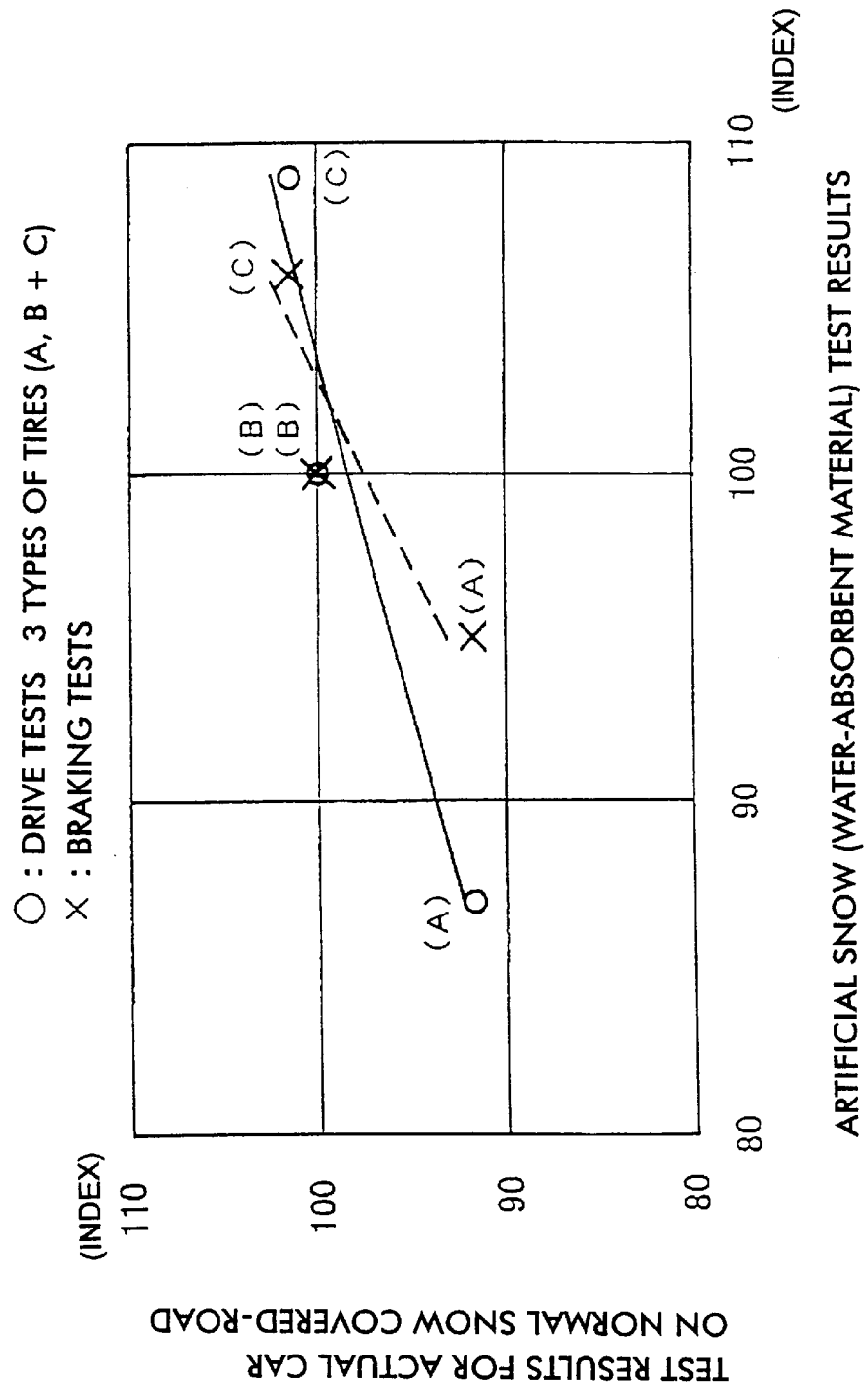
FIG. 9 is a graph showing the relation between testing on normal snow (ice) and artificial snow (water-absorbent material).

A leveling device 150 is provided in the vicinity of the turntable 72, as indicated in FIG. 5 and FIG. 8.

The leveling device 150 is provided with a support column 152 that is fixed to the testing room 82, and a frame 154 extending in the horizontal direction is attached to this support column 152.

A blade support arm 156 is attached to the upper face of the frame 154 so that its position can be adjusted in the lengthwise direction of the frame 154.

A pair of slide bushes 164 are attached to the blade support arm 156 having their axial line in the vertical direction.

Slide shafts 166 are inserted into the slide bushes 164 so as to be able to slide freely, and a blade attachment plate 168 is attached to the lower ends of the slide shafts 166.

A blade 170 having a bear's-claw form (rake form) so as to be able to level the surface of the artificial snow layer 83 is attached to this blade attachment plate 168.

A feeding screw 172 is attached to the blade attachment plate 168 parallel to the slide shafts 166. On the other side, a nut (not shown in the figures) which engages with the feeding screw 172 can rotate and is held on the blade support arm 156, and the vertical motion of the feeding screw 172, i.e., the vertical motion of the blade 170, is made possible by rotating this nut with a handle 174.

Next, an example of the method of testing tires using the on-snow tire-testing device 10 of this embodiment is explained.

First, in the on-snow tire-testing device 10, water is placed in the artificial snow filling part 80 of the turntable 72, the artificial snow cooling device 84 is activated, and an ice layer 81 (in this embodiment, approximately 50 mm above the coolant tube 86) is formed in the artificial snow filling part 80.

Next, a granular water-absorbent material which has been made to absorb water is spread in even thickness (30 mm in this embodiment) on the ice layer 81, and this water-absorbent material is frozen by cooling overnight (in this embodiment, −5° C.; the room temperature is also made −5° C.), forming the artificial snow layer 83. A water-absorbent material which has been already cooled, i.e., an artificial snow, also may be spread on the ice layer 81.

Since the state of the artificial snow changes according to the temperature in the same way as actual snow, in order to make the entire artificial snow layer 83 a uniform state, it is necessary to reduce unevenness of temperature.

By placing the ice layer 81 under the artificial snow where 83, the entire artificial snow layer 83 can be maintained at a roughly uniform temperature, and on-snow testing can be performed with a high-level reliability on the artificial snow layer 83 which is in a uniform state. Moreover, since the coolant tube 86 is positioned below the ice layer 81, the coolant tube 86 is protected by the ice layer 81.

In the on-snow tire-testing device 10 of this embodiment, the artificial snow layer 83 becomes the testing road surface for the on-snow testing of the tire 11, and testing can be performed while changing the conditions of the artificial snow.

For example, in order to make the test road surface a compacted-snow road, the artificial snow layer 83 can be compacted by rotating the turntable 72 while pressing the pressure-rotation roller 142 on the artificial snow layer 83.

The artificial snow layer 83 can be set as a road surface of varying hardness by adjusting the compressive force of the pressure-rotation roller 142.

Further, by precipitating the artificial snow by means of the snowfall device 98, it is possible to produce road conditions of soft, newly fallen snow.

Specifically, the on-snow performance of the tire can be measured under road conditions from a snow-covered road to a compacted snow-covered road to a road having ice like conditions, where the compaction number is approximately 50–100, when the road surface is measured using a Smithers CTI Snow Compaction Gauge.

On-snow tests were performed on tires (three types: A, B, and C) (driving tests and braking tests) using artificial snow produced by freezing a granular water-absorbent material that has been made to absorb water, and the test results were compared with tests on normal roads using actual vehicles (fitted with the aforesaid three types of tires: A, B, and C), as shown in the graph in FIG. 9. The artificial snow produced by freezing the water-absorbent material was found to obtain test results similar to test results using actual vehicles on normal roads. For example, in a driving test using tire A, the evaluation on a normal road is approximately 92 (index) while the evaluation with artificial snow (water-absorbent material) is approximately 87. Further, in a driving test using higher B, the evaluation on a normal snow-covered road is 100, while the evaluation with artificial snow (water-absorbent material) is 100. Thus, when tests are performed using artificial snow (water-absorbent material), test results similar to those when tests were performed on normal snow-covered roads can be obtained.

In order to level the surface of the artificial snow layer 83, the turntable 72 is rotated, the blade 170 of the leveling device 150 is lowered, and by bringing the lower end of the blade 170 into contact with the surface of the artificial snow layer 83, the surface can be leveled.

By gradually lowering the blade 170 while rotating the turntable 72, the artificial snow 83 can be dug up, and, for example, the state of artificial snow layer 83 (i.e., packed snow road conditions) where the snow has hardened can be changed to soft conditions.

This leveling device 150 may also serve as a snow removal device by replacing the blade 170.

The leveling device can be used as a snow removal device by replacing blade 170 having the bear's-claw form with a blade the lower edge of which is flat, and gradually lowering the blade while pressing on the surface of the artificial snow layer 83. By this means, snow removal can be performed on the artificial snow layer 83.

In this on-snow tire-testing device 10, slip can be produced between the tire 11 and the artificial snow layer 83 according to the rotational speed of the tire 11, the rotational speed of the turntable 72, and the position of the tire 11. The slip rate also can be adjusted easily according to the rotational speed of the tire 11, the rotational speed of the turntable 72, and the position of the tire 11.

For example, conditions of driving and acceleration, etc., can be reproduced by setting circumferential speed of the tire 11 so as to be faster than the movement speed (tire contact part) of the artificial snow layer 83, and deceleration conditions, etc., can be reproduced by setting the circumferential speed of the tire 11 so as to be slower than the movement speed (tire contact part) of the artificial snow layer 83.

Further, in this on-snow tire-testing device 10, the slip-angle can be applied to the tire 11 by changing the direction of the spindle 46, and conditions in which the steering wheel has been turned can be reproduced.

In the foregoing embodiment, testing of the tire 11 was performed by spreading artificial snow on the turntable 72 of the on-snow tire-testing device 10, but testing can also be performed by spreading the artificial snow on a normal road surface (asphalt, concrete, etc.).

By installing a tire anti-slip device (so-called "snow chains") on the tire 11 and performing testing, test data (performance data for the tire anti-slip device) can be obtained for the tire 11 with the tire anti-slip device installed.

The on-snow tire-testing method of the present invention has an excellent effect of enabling highly reliable on-snow test data for tires to be obtained at any time without requiring snowfall, and allowing tests to be performed at low cost. Further, it enables initial road surface conditions to be maintained, and on-snow test data to be obtained when the temperature of the artificial snow layer is set at 0° C. or below.

The on-snow tire-testing method also enables test data to be obtained that is similar to test data obtained in on-snow tests with actual snow-covered roads, and which can be obtained under target road conditions.

The on-snow tire-testing method enables on-snow tire tests to be performed in a narrow space, and enables test data to be obtained for cases where the tire slips, i.e., when a slip-angle is applied to the tire.

The on-snow tire-testing method has an excellent effect of eliminating the necessity to add water when the next test is performed, and therefore of minimizing costs of on-snow tire tests.

The on-snow tire-testing device enables on-snow tire tests to be performed by applying various loads to the tire, and enables tests of driving and braking to be performed.

The on-snow tire-testing device permits tests to be continued for a long period of time under various road surface conditions.

The on-snow tire-testing device allows the entire artificial snow layer to be maintained at a roughly uniform temperature, and allows highly reliable on-snow test data to be obtained with an artificial snow layer in a uniform state.

The on-snow tire-testing device enables the melting of the artificial snow and ice layer to be prevented, and various road surface conditions similar to those of actual road surfaces to be obtained by changing the cooling temperature.

The on-snow tire-testing device enables the artificial snow layer to be set in a state similar to an actual snow-packed road.

The on-snow tire-testing device enables tire-testing to be performed on an artificial snow layer that has been leveled.

The on-snow tire-testing device enables artificial snow arranged on the artificial snow layer arrangement device to be removed.

The on-snow tire-testing device enables an artificial snow layer to be formed easily on the artificial snow layer arrangement device, and road surface conditions of newly fallen snow to be obtained.

The road surface for an on-snow tire-testing device enables highly reliable on-snow testing of tires to be performed at low cost and at any time without requiring snowfall.

The on-snow tire-testing method enables on-snow tire test data to be obtained when a tire anti-slip device has been installed.

While specific embodiments have been described in detail, it is understood that the invention is not limited to such embodiments, but may be variously modified, altered and changed and still be within the true spirit and scope of the invention.

What is claimed is:

1. A method for testing tires on an artificial snow layer, comprising:

placing in a layered form and cooling an artificial snow including a granular water-absorbent material that has been made to expand by the addition of water; and running a tire on the artificial snow layer.

2. A method according to claim 1, comprising placing the artificial snow on an ice layer.

3. A method according to claim 2, comprising cooling the ice layer with a cooling device, wherein the cooling device is arranged on a bottom face of the artificial snow layer and/or within an interior of the artificial snow layer.

4. A method according to claim 1, comprising compressing the artificial snow before said running step.

5. A method according to claim 4, comprising reproducing one or more types of road conditions by increasing or decreasing the amount of compression.

6. A method according to claim 1, comprising rotating the artificial snow layer.

7. A method according to claim 6, comprising rotating the tire on the artificial snow layer, and generating slipping between the artificial snow layer and the tire by increasing or decreasing the rotational speed of the tire.

8. A method according to claim 7, comprising making the tangential direction of rotation of the artificial snow layer and the direction of the equatorial plane of the tire differ, so as to provide the tire with a slip angle.

9. A method according to claim 1, comprising increasing or decreasing the water absorption factor by 10 to 100 times in order to reproduce various road surface conditions.

10. A method according to claim 2, comprising reproducing various road surface conditions by increasing or decreasing the temperature of at least one of the artificial snow layer and the ice layer.

11. A method according to claim 1, comprising preserving and reusing the water-absorbent material.

12. A method according to claim 1, comprising preserving the water-absorbent material in a gel form containing water.

13. An on-snow tire-testing system, comprising:

an artificial snow layer arrangement device, on which artificial snow including a granular water-absorbent material, which has been made to expand by the addition of water, is arranged in a layered state, a cooling device, which cools the artificial snow layer, and a tire-testing device, which can rotate and which supports a tire and performs testing on the tire on the artificial snow layer.

14. A system according to claim 13, comprising a rotating device which causes the artificial snow layer to rotate.

15. A system according to claim 14, wherein said tire-testing device has a tire pressing device, which presses the tire onto the artificial snow layer.

16. A system according to claim 13, wherein said tire-testing device includes a driving/braking device, which exerts a driving force and/or a braking force on the tire.

17. A system according to claim 14, wherein said tire-testing device includes a slip-angle applying device, which provides the tire with a slip-angle by causing the tangential direction of the rotation of the artificial snow layer and the direction of the equatorial plane of the tire to differ.

18. A system according to claim 14, comprising a tire moving device, which moves the tire along the rotational radial direction of the artificial snow layer.

19. A system according to claim 13, comprising an ice layer disposed on the undersurface of the artificial snow layer.

20. A system according to claim 19, comprising a cooling device, which cools at least one of the artificial snow layer and the ice layer.

21. A system according to claim 13, comprising a pressure-rotation device, which applies pressure to the artificial snow layer while rotating the artificial snow layer.

22. A system according to claim 13, comprising a leveling device, which levels the surface of the artificial snow layer.

23. A system according to claim 13, comprising a snow removal device.

24. A system according to claim 13, comprising a snowfall device, which causes artificial snow to fall on the artificial snow layer.

25. A method according to claim 1, comprising installing an anti-slip device to the tire.

26. A method according to claim 1, comprising reproducing various road surface conditions by increasing or decreasing the temperature of the artificial snow layer.

\* \* \* \* \*